United States Patent [19]
Juliano et al.

[11] 3,887,636
[45] June 3, 1975

[54] ORGANO(BLOCK-AMIDE-SILOXANE)-(BLOCK-AMIDE-IMIDE) POLYMERS

[75] Inventors: Peter C. Juliano, Scotia; Tyrone D. Mitchell, Troy, both of N.Y.; Simon W. Kantor, Ridgewood, N.J.

[73] Assignee: General Electric Company, Schenectady, N.Y.

[22] Filed: Dec. 5, 1973

[21] Appl. No.: 422,024

[52] U.S. Cl. ........ 260/824 R; 260/30.2; 260/30.4 N; 260/30.4 SB; 260/30.6 SB; 260/30.8 R; 260/31.4 R; 260/32.4; 260/32.6 R; 260/32.6 N; 260/33.6 SB; 260/46.5 E; 260/78 R; 260/857 PA
[51] Int. Cl. ...................... C08g 41/04; C08g 47/10
[58] Field of Search ...................... 260/824, 46.5 E

[56] References Cited
UNITED STATES PATENTS

| | | | |
|---|---|---|---|
| 3,288,754 | 11/1966 | Green ............................. | 260/824 R |
| 3,522,199 | 7/1970 | Keberle et al. ................... | 260/824 R |
| 3,598,783 | 8/1971 | Holub et al. ...................... | 260/824 R |
| 3,598,785 | 8/1971 | Holub et al. ...................... | 260/824 R |
| 3,781,237 | 12/1973 | Aluino et al. ..................... | 260/824 R |
| 3,833,681 | 9/1974 | Holub et al. ...................... | 260/824 R |

*Primary Examiner*—Wilbert J. Briggs, Sr.
*Attorney, Agent, or Firm*—F. Wesley Turner; Joseph T. Cohen; Jerome C. Squillaro

[57] ABSTRACT

Novel organo(block-amide-siloxane)-(block-amide-imide) polymers are prepared by a novel process comprising contacting an organodicarboxyterminated imide with an organodicarboxyterminated polysiloxane in the presence of an organodiisocyanate coupling agent. The resulting polymers are high molecular weight polymers having essentially linear recurring units comprising short chain amide-imide polymer blocks having the general formulas:

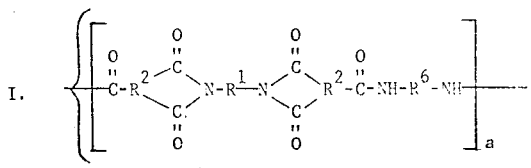

or,

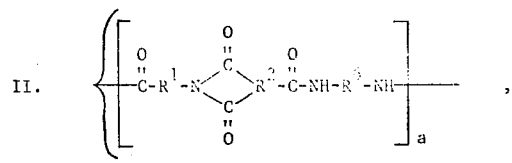

and a long chain amide-siloxane polymer blocks having the formula:

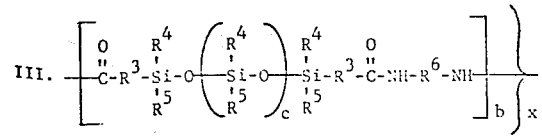

wherein both a and b are positive numbers, the ratio of $a/a+b$ is within the range of from about 0.01 to about 0.99, c is a positive number within the range of from about 0 to about 500, and x is a positive number within the range of from about 4 to about 10,000.

The novel polymers are readily dissolved in suitable solvents for the application of a protective polymer coating on wire and cable substrates, or for the application of polymer films which have improved adhesion to glass.

19 Claims, No Drawings

ORGANO(BLOCK-AMIDE-SILOXANE)-(BLOCK-AMIDE-IMIDE) POLYMERS

This invention relates to organo(block-amide-siloxane)-(block-amide-imide) polymers and to novel methods for the preparation thereof.

The combination of amide and siloxane recurring units in a polymer skeletal backbone have been found to be advantageously employed in the preparation of polymers which are useful in coating applications where the coating resistance to heat and corona effects are important. Representative prior art disclosures which describe the benefits of recurring amide-siloxane units in polymers include U.S. Pat. No. 3,598,785 which discloses the preparation of amide-siloxane polymers from the reaction of an organicdiamine trimellitic anhydride and a polysiloxane. Other prior art disclosures which describe the general properties of recurring imide-siloxane or amide-siloxane units in polymeric materials include, among others, U.S. Pat. Nos.: 3,274,155; 3,278,485; 3,325,450; 3,338,859; 3,440,203; 3,444,128; 3,553,282; 3,673,155 and 3,723,385. Although the prior art has described various means for providing polysiloxane polymeric materials containing either amide and/or imide units in the skeletal backbone of the polymeric material or as pendant groups attached thereto, heretofore, the prior art has not found nor identified the novel compositions of this invention which comprise an organo(block-amide-siloxane)-(block-amide-imide) polymers, nor the novel methods for the preparation thereof.

In general, the novel compositions of this invention are beneficially employed in coating applications particularly where the coating compositions are used to resist the effects of heat and on corona upon a metal or glass substrate surfaces. The polymer compositions of this invention due to their molecular structure permit high polymer solids content and relatively low solvent levels to be employed in coating applications which contain the novel polymers, thereby reducing the amount of solvent loss during the coating or casting of film — a property which is especially desirable where costly solvent systems are necessarily employed to solvate the polymer system. Moreover, in addition to having desirable thermal and electrical properties, the novel polymers of this invention exhibit excellent adhesion (bond strength) when adhered to metal or glass substrate surfaces which permits the ready and convenient application thereof to metal and glass surfaces, among others.

The novel method of preparing the compositions of this invention which broadly comprises the coupling of organodicarboxyterminated imides and organodicarboxyterminated polysiloxanes by employing organodiisocyanates as a coupling agent — provides a convenient means of preparing and maintaining or assisting in the maintenance of relatively uniform solution viscosities of high molecular weight polymers that contain short chain amide-imide polymer blocks and long chain amide-siloxane polymer blocks. Additional advantages of this novel method of preparing the novel polymers of this invention are the reduction of intermolecular (crosslinking) and intramolecular (nonlinear) condensation believed to be associated with the preparation of prior art amide-imide-siloxane polymeric materials wherein the materials are prepared from polymer precursors having terminal amine and/or amide and carboxy function end groups. Further, the method of this invention provides an effective means of introducing amide-imide-siloxane units into a polymer skeletal backbone in substantially linear form without the occurrence of undesirable prior art side reactions which are believed to cause low molecular weight, variable viscosity, highly branched or cross-linked insoluble polymers which result when prior art polymer reactant precursors are employed rather than the reactant presursors of our invention.

In accordance with this invention, novel organo-(block-amide-siloxane)-(block-amide-imide) polymers, hereinafter sometimes referred to as organo (B-A-S)-(B-A-I) polymers, are prepared by a novel process comprising contacting an organodicarboxyterminated imide with an organodicarboxyterminated polysiloxane in the presence of an organodiisocyanate coupling agent. The resulting polymers are high molecular weight polymers having essentially linear recurring units comprising short chain amide-imide polymer blocks having the general formulas:

I.

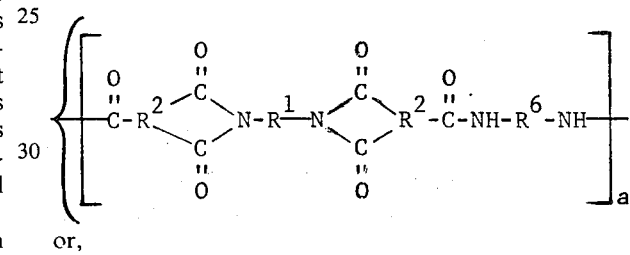

or,

II.

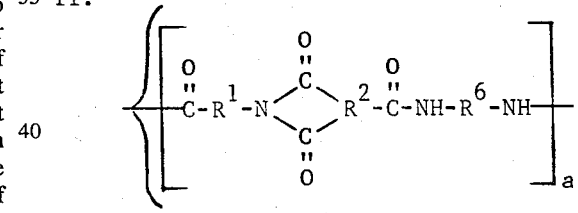

or mixtures thereof, and a long chain amide-siloxane polymer blocks having the formula:

III.

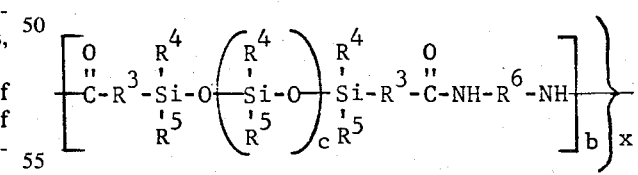

wherein $a$ and $b$ are positive numbers, the unit number ratios of $a/a+b$ is within the range of from about 0.01 to about 0.99, $c$ is a positive number within the range of from about 0 to about 500, and $x$ is a positive number within the range of from about 4 to about 10,000.

The organodicarboxyterminated imide monomer reactants, hereinafter sometimes referred to as (DCTI), which may be employed in the practice of our invention comprise compounds of the following general formulas:

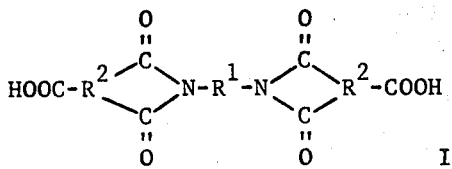

IV. A.

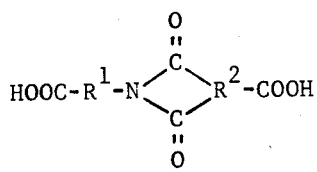

IV. B.

wherein $R^1$ is selected from the group consisting of substituted and unsubstituted divalent hydrocarbon radicals, the carbonyl $$(-\overset{\overset{O}{\|}}{C}-)$$

radical, oxygen, a sulfonyl $$(-\overset{\overset{O}{\|}}{\underset{\underset{O}{\|}}{S}}-)$$

radical, sulfur and combinations thereof; and each $R^2$ is a trivalent aromatic hydrocarbon radical.

The organodicarboxyterminated polysiloxane monomer reactants, hereinafter sometimes referred to as (DCTPS), which may be employed in the preparation of our novel block polymers comprise compounds of the following general formula:

$$(HOOCR^3)_d(R^4)_e(R^5)_f SiO_{[4-(d+e+f)]/2}$$

V.

wherein each $R^3$ is an alkylene radical of from about 2 to about 12 carbon atoms, $R^4$ and $R^5$ are monovalent hydrocarbon radicals, $d$ is equal to from 0.001 to 1, inclusive, $e$ is equal to from 0 to 2, inclusive, $f$ is equal to from 0 to 3, inclusive, and the sum of $d$, $e$ and $f$ is equal to from 1.5 to 3, inclusive.

The organodiisocyanate monomer reactants, hereinafter sometimes referred to as (DIC), which may be employed in the practice of this invention comprise compounds having the following general formula:

$$O=C=N-R^6-N=C=O$$

VI.

wherein $R^6$ is selected from the group consisting of divalent hydrocarbon radicals which contain at least 3 carbon atoms and which are free from aliphatic unsaturation.

In general, the preparation of the novel polymers of this invention comprises the reaction of DCTI and DCTPS with DIC acting as a coupling linking the DCTI and DCTPS monomeric reactants together. In the preparation of organo-(B-A-S)-(B-A-I) polymers, it is usually preferable to employ the DCTI, DCTPS and DIC reactants to amounts which are sufficient to provide at least one isocyanate reactive group (—N=C=O) derived from a DIC reactant and at least one reactive carboxyl (—COOH) group derived from either of the DCTI or DCTPS reactants.

Empirically, when the DCTI reactant of Formula IVA is used, the short chain amide-imide polymer block recurring units and the long chain amide-siloxane polymer block recurring units of the polymers of this invention can be represented according to the following formula:

VII.

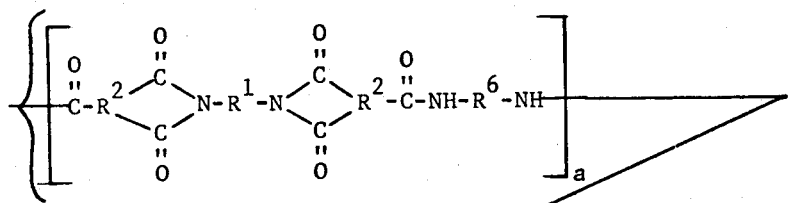
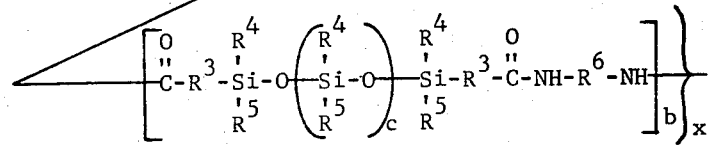

wherein $R^1$, $R^2$, $R^3$, $R^4$, $R^5$, $R^6$, $a$, $b$, $c$, $x$, and the ratio of $a/a+b$ are as defined hereinbefore.

Further, when the DCTI reactant of Formula IVB is used, the recurring units of the polymers of this invention can be represented according to the following formula:

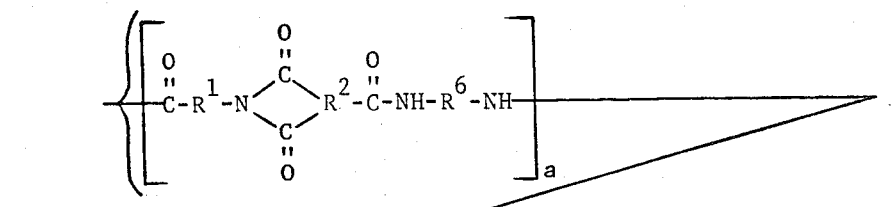

VIII.

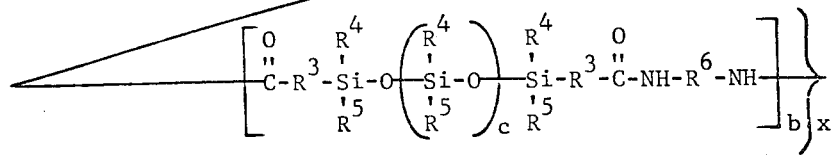

wherein $R^1$, $R^2$, $R^3$, $R^4$, $R^5$, $R^6$, $a$, $b$, $c$, $x$, and the unit ratio range values of $a/a+b$ are as defined hereinbefore.

The organodicarboxyterminated imide (DCTI) of formulas IVA or IVB can be any dibasic carboxyterminated imide which is free of functional groups or substituents present within the DCTI molecule which interferes or deters the coupling of the organodicarboxyterminated imide (DCTI) reactants via the organodiisocyanate (DIC) coupling agents of Formula VI to the dicarboxyterminated polysiloxanes (DCTPS) of Formula V. Representative of substituents which may deleteriously affect the desired coupling reaction are the following substituents: —COOH (any which are additional to the two carboxy groups of the DCTI reactants), —COOR', —NH$_2$, and —NHR' wherein $R^1$ represents a monovalent hydrocarbon radical. Essentially the deleterious groups comprise functional sites which would tend to decrease the probability of obtaining the desired linear organo(B-A-S)-(B-A-I) polymers by the occurrence of inter- or intramolecular side reactions which could promote crosslinking of the linear siloxane-imide-amide skeletal structure.

A convenient means of preparing the organodicarboxyterminated imide (DCTI) reactants of this invention, which also includes the preparation of a presently preferred (DCTI) reactant, e.g., methylene bis[N-phenylene-4-carboxyphthalimide], comprises the reaction of an organomono- or polyamide with an organocarboxymono- or polyanhydride, e.g. methylene dianiline with trimellitic anhydride.

Representative of polyamines which can be employed in the preparation of the (DCTI) imides of Formulas IVA and IVB include among others those reported in the *Encyclopedia of Polymer Science and Technology*, Vol. 11, on pages 253–254. Included in the list of diamines set out in said referenced Encyclopedia are such compounds as m-phenylenediamine, p-phenylenediamine, 4,4'-diaminodiphenylpropane, 4,4'-diaminodiphenylmethane, benzidine, 4,4'-diaminodiphenyl sulfide, 4,4'-diaminodiphenyl sulfone, 4,4'-diaminodiphenyl ether, 1,5-diaminonaphthalene, 3,3'-dimethylbenzidine, 3,3'-dimethoxybenzidine, 2,4-bis(β-amino-t-butyl)toluene, bis(p-β-amino-t-butylphenyl)ether, bis(p-β-methyl-α-aminopentyl)benzene, 4-isopropyl-m-phenylenediamine, 1,2-bis(3-aminopropoxy)ethane, m-xylylenediamine, p-xylylenediamine, bis(4-aminocyclohexyl)methane, piperazine, decamethylenediamine, 3-methylheptamethylenediamine, 4,4-dimethylheptamethylenediamine, 2,11-dodecanediamine, 2,2-dimethylpropylenediamine, octamethylenediamine, 3-methoxyhexamethylenediamine, 2,5-dimethylhexamethylenediamine, 2,5-dimethylheptamethylenediamine, 3-methylheptamethylenediamine, 5-methylnonamethylenediamine, 1,4-cyclohexanediamine, 1,12-octadecanediamine, bis(3-aminopropyl)sulfide, N-methyl-bis-(3-aminopropyl)amine, hexamethylenediamine, heptamethylenediamine, and nonamethylenediamine.

Representative of monoamines which can be employed in the preparation of the (DCTI) imides of Formula IV which can be used in the practice of this invention, includes among others, monocarboxylic-monoamino hydrocarbons set out in *Synthetic Organic Chemistry* by Wagner and Zook (1953) pages 706–710. Included in the monoaminemonocarboxylic acids set out in the aforesaid referenced text are the following: aminoacetic acid, α-aminopropionic acid, β-aminopropionic acid, α-amino-n-butyric acid, γ-aminobutyric acid, α-aminoisobutyric acid, α-amino-β-hydroxybutyric acid, α-aminovaleric acid, γ-aminovaleric acid, δ-aminovaleric acid, γ-amino-β-methylbutyric acid, α-amino-α-methylsuccinic acid, dl-α-amino-n-caproic acid, ε-aminocaproic acid, α-dimethylaminoisobutyric acid, α-aminoadipic acid, α-aminoheptanoic acid, β, β-diethyl-β-aminopropionic acid, β-dimethylaminopivalic acid, α-aminophenylacetic acid, o-aminophenylacetic acid, m-aminophenylacetic acid, p-aminophenylacetic acid, p-aminomethyl-benzoic acid, α-aminononanoic acid, α-amino-α-phenylpropionic acid, α-amino-β-phenylpropionic acid, m-dimethylaminobenzoic acid, p-dimethylaminobenzoic acid, β-anilinopropionic acid, dl-γ-phenyl-α-aminobutyric acid. It should be noted that the above illustrations of amino compounds are merely for the purposes of illustration and not to be considered as all inclusive or limited upon the scope of the amines or amino acids which are suitable for the preparation of the organodicarboxyterminated imides of Formulas IVA and IVB.

In the preparation of the organodicarboxyterminated imides (DCTI) pf Formulas IVA and IVB, it is preferred that the amine constituent be available in stoichiometric amounts sufficient to convert or react with substantially all of the anhydride linkages contained in the organocarboxy anhydride reactants.

Representative of the organocarboxymono- or polyanhydride reactants which can be reacted with the mono- or polyamines, set out hereinbefore, in the preparation of the organodicarboxyterminated imides of Formulas IVA and IVB include, among others, those represented by the following formula:

IX. 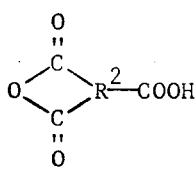

wherein $R^2$ is a trivalent aromatic radical. Representative of specific chemical compounds falling within the scope of the aforementioned formula are the following: trimellitic acid monoanhydride also known as 1,2,4-monoanhydride tricarboxybenzene, hemimellitic acid monoanhydride also known as 1,2,3-monoanhydride tricarboxybenzene.

The dicarboxyterminated polysiloxanes (DCTPS) referred to hereandbefore and described by Formula V, can be prepared by any method well known in the art such as the method described in Bluestein U.S. PAT. No. 3,271,359 which methods are hereby incorporated in this application by reference.

It is to be understood that the term dicarboxyterminated polysiloxane (DCTPS) includes polysiloxanes wherein carboxy groups that are displaced apart along the backbone of a polysiloxane but are not necessarily attached either to a terminal silicon atom or a terminal carbon atom of an alkylene group of the skeletal structure of the (DCTPS). Preferred dicarboxyterminated polysiloxanes within the scope of this invention include those represented by the following formula:

X. 

wherein one M' is an $(R^3)_3SiO_{1/2}$ radical wherein at least one of the $R^3$ groups is a carboxyterminated alkylene radical, and the other $R^3$ groups are the same as defined hereinbefore, M' is an $(R^3)_3Si$ radical wherein at least one of the $R^3$ groups is a carboxyterminated alkylene radical, and the remainder of the D' is an

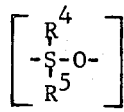

group, $R^4$ and $R^5$ are the same as defined hereinbefore, and c is a positive number having a value of from about 0 to about 500. As will be pointed out in greater detail hereafter, it is highly desirable and preferable in the preparation of high molecular weight polymers of this invention that the D' units of Formula X contain alkyl and aryl radicals since it has been advantageously found that organo(B-A-S)-(B-A-I) polymers prepared from dicarboxyterminated polysiloxane reactants that have both alkyl and aryl substituents bonded to silicon atoms of the dicarboxyterminated polysiloxanes permit the preparation of uncommonly high molecular weight organo(B-A-S)-(B-A-I) polymers.

The organodiisocyanates (DIC) of Formula VI referenced hereinbefore that can be employed in the preparation of the novel polymers of this invention can be prepared by any method well-known to those skilled in the art. Among others, the following representative diisocyanates can be employed in the practice of this invention: 4,4'-diphenylmethane diisocyanate, dianisidine diisocyanate, tolidine diisocyanate, hexamethylene 60:40m-xylylene diisocyanate, 1-chloro-2,4-phenylene diisocyanate, m-phenylene diisocyanate, p-phenylene diisocyanate, 2,4-/2,6-tolylene diisocyanate (60-40), 2,6-tolylene diisocyanate, 3,3'-dimethyl-4,4'-biphenylene diisocyanate, 3,3'-dimethyl-4,4'-diphenylmethane diisocyanate, 3,3'-dimethoxy4,4'-biphenylene diisocyanate, 2,2', 5,5'-tetramethyl-4,4'-biphenylene diisocyanate, 2,4-/2,6-tolylene diisocyanate (80:20), methylcyclohexylene diisocyanate, dicyclohexylmethane diisocyanate, lysine diisocyanate, bis(2-isocyanatoethyl) fumarate, bis(2-isocyanatoethyl) carbonate as well as "dimeryl" diisocyanates having up to 36 carbon atoms in the hydrocarbon chain. Among the diisocyanates preferably employed in the practice of this invention, is the commercial toluene diisocyanate mixture which consists of about 80% by weight of 2,4-toluene diisocyanate and about 20% by weight of 2,6-toluene diisocyanate, generally referred to as 2,4-/2,6-tolylene diisocyanate (80:20).

The process of this invention comprises essentially the provision of a suitable method for the preparation of a suitable monomer, polymer, homogeneous reaction media which permits the formation of high molecular weight organo(block-amide-imide)-(block-amide-siloxane) polymers having essentially linear recurring units which comprise short chain amide-imide polymer blocks and long chain imide-siloxane polymer blocks.

In general, any solvent can be employed in the process of this invention which provides a homogeneous reaction medium for the organodicarboxyterminated imide (DCTI) and the organodicarboxyterminated polysiloxane (DCTPS) during coupling of the aforementioned reactants by an organodiisocyanate (DIC). Because of the limited solubility of organoimides in most of the common chemical solvents, it is essential that highly polar solvents be employed either solely or in combination with nonpolar solvents. Representative polar solvents that are preferably employed are the following: N,N-dimethylformamide, N,N-dimethylacetamide, N,N-diethylformamide, N,N-diethylacetamide, N,N-dimethylmethoxyacetamide, dimethylsulfoxide, N-methyl-2-pyrrolidone, pyridine, dimethylsulfone, hexamethylphosphoramide, tetramethylenesulfone, dimethyltetramethylenesulfone, dioxane, benzonitrile, beta-ethoxyethylacetate, butyrolactone, and the like. Mixtures of the foregoing polar solvents can also be employed along with other nonpolar solvents such as benzene, xylene, toluene, cyclohexane, and the like. Unexpectedly, it was found that during the process of attempting to prepare the high molecular weight polymers of our invention by coupling an organodicarboxyterminated polydimethylsiloxane to an organodicarboxyterminated imide by means of an organodiisocyanate coupling agent that even though equal parts by weight of polar and nonpolar solvent, such as N-methyl-pyrrolidone (NMP) and toluene, were employed, that elevated temperatures of at least 160° C. were required in order to homogenize reactant mixtures containing (DCTI) imides and (DCTPS) polysiloxanes. In order to provide suitable organodicarboxyterminated polysiloxane reactants of greater solubility in NMP, it was found advisable to use organodicarboxyterminated polymethylphenylsiloxanes of the formula $M'(D'')_yM'$ having a $(D'')_y$ value wherein $y$ is an integer within the range of from about 1 to about 200 using known prior art equilibration reaction conditions. For example, where an $M'D''_{14.5}M'$ and $D''_3$ siloxanes of the formulas:

XI.

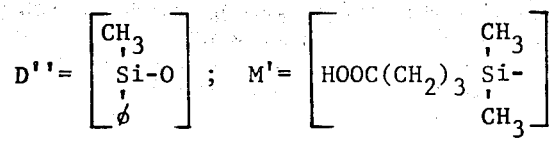

are equilibrated in the presence of a suitable equilibration catalyst, such as $F_3CSO_3H$, this led to the formation of an $M'D''_{65.6}M'$ siloxane (DCTPS) reactant, and the resulting $M'D''_{65.6}M'$ reactant was readily soluble in any polar organic solvent, such as NMP.

The preparation of our novel polymers acan be carried out across a wide temperature range which includes any temperatures wherein the desired reaction occurs in the absence of any significant deleterious side reactions such as intermolecular and intramolecular condensation or crosslinking of our novel low, intermediate and high molecular weight organo(B-A-S)-(B-A-I) polymers. Generally, these deleterious reactions frequently occur at a temperature range of about 250° to about 300° C. Accordingly, a preferred temperature range in the preparation of our novel polymers comprises a temperature within the range of from about 23° C. (ambient room temperatures) to about 200° C. Generally, presently preferred reactions temperatures are within the range of from about 100° C. to about 200° C.

Another embodiment of our process invention includes the use of a reaction promoter to provide optimum reaction kinetics at minimal temperatures. The promoters that can be employed in the practice of our invention include broadly any catalytically active tertiary amine. Among the tertiary amine promotors or catalysts that can be employed in the process of our invention are such compounds as trialkylamines, such as triethylamine, tributylamine, dimethylethylamine, dimethylcyclohexylamine; triarylamines, such as triphenylamine, tritolylamine; alkaryl amines, e.g. dimethylphenylamine, benzyldimethylamine, trinaphthylamine; cyclic amines, e.g. pyridine, quinoline; N-substituted piperidine, such as N-methylpiperidine; e.g., N,N,N', N'-tetramethylethylenediamine, N,N,N',-N'-tetramethylbutylenediamine, tetramethylquanidine, etc. A presently preferred promoter is triethylenediamine of the following formula:

XII.

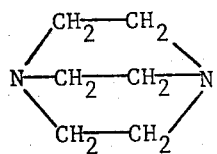

The tertiary amine employed in this invention is a true catalyst, and therefore need be employed only in catalytic amounts. Experience has shown that satisfactory block polymers can be produced wherein the amount of amine catalyst or promoter employed in our process is within the range of from about 0.1 to 0.3% by weight based on the total weight of the reaction mixture. Generally, acceptable process reaction rates are obtained by employing amounts of promoter which are lower than 1% by weight or which are greater than 0.1% by weight, however, no particular advantage is observed in using less than 0.1% by weight, or more than 0.5% by weight based on the total weight of the reaction mixture.

The polymer prepared in accordance with our process can be separated from the reaction media by any separating means including solvent extraction means which employ aliphatic or cycloaliphatic ethers. Separation of the polymers from the reaction media by solvent extraction at temperatures lower than about 200° C. is a presently preferred method of purifying the polymer — particularly where the resulting polymers are to be cast or spun as polymer fibers, films and the like — since removal of the solvent by evaporation at elevated temperatures — particularly above 200° C. — can cause the resulting polymer to be cross linked thereby undesirably reducing its solubility in casting or spinning solvents as well as add to the difficulty of preparing commercial casting or spinning polymer solutions of uniform solution viscosity.

In order that those skilled in the art will be better able to practice the present invention, the following examples are given by way of illustration and not by way of limitation. All parts are by weight unless otherwise indicated.

EXAMPLE I(A)

2.73 grams (5 × $10^{-3}$ mole) of methylene bis[N-paraphenylene-4-carboxyphthalimide] and 9.30 grams (5 × $10^{-3}$ mole) of a dimethylsiloxane fluid (D) chain terminated with 3-carboxypropyldimethylsiloxy groups (M') of structure $M'D_{21}M'$ was dissolved in a mixture of 20.61 grams xylene and 30.61 grams N-methylpyrrolidone. To this mixture was added 0.112 gram triethylenediamine. The mixture was heated to 150° C. to dissolve all of the reactants, and 1.74 grams (1 × $10^{-2}$ mole) of 2,4-/2.6-toluenediisocyanate (80:20) was added very slowly thereto. When all of the toluenediisocyanate was added and $CO_2$ evolution had ceased, a sample was withdrawn and titrated to determine the milliequivalents of unreacted acid carboxy groups.

When the titration results showed essentially no unreacted carboxy acid groups to be present, the reaction mixture was cooled to 80° C. and a small amount of n-propanol was added. The reaction mixture was then reheated to 150° C. and held at this temperature for 15 minutes and then cooled to 80° C. at which time a small amount of acetic acid was added to neutralize the amine catalyst. The resulting very viscous (25 wt. % solids) solution was cooled to room temperature and the polymer precipitated by pouring into 500 ml. of methanol. The polymer was filtered and treated 24–48 hours with methanol and then with hexane. The treated polymer was dried in a vacuum over at a temperature of 40° C. for 24 hours. The dried polymer was analyzed for % silicon intrinsic viscosity, and % weight loss by a thermogravimetric method. The dried polymer data obtained from two different experiments are set out in Table I, under Experiment numbers 1a and 2a.

EXAMPLE I(B)

2.73 grams (5 × $10^{-3}$ mole) of methylene bis[N- paraphenylene-4-carboxyphthalimide] and 10.89 grams ($5 \times 10^{-3}$ mole) of a phenylmethylsiloxane fluid (D'') chain terminated with 3-carboxypropyldimethylsiloxy groups (M') of structure $M'D''_{14.5}M'$ was dissolved in 43.44 grams of N-methylpyrrolidone. To this mixture was added 0.112 gram of triethylenediamine catalyst. The mixture was heated to 140° C. and the addition of 2.4-/2.6-toluene-diisocyanate (80:20). 1.74 g. ($1 \times 10^{-2}$ mole), was started. The progress of the reaction was followed by observing the $CO_2$ evolution. At the end of the toluenediisocyanate addition the reaction mixture was titrated with toluenediisocyanate by observing the $CO_2$ evolution. This was continued until the $CO_2$ evolution stopped. The reaction mixture was then processed in the same manner as in the previous example part (A) after the $CO_2$ evolution ceased. The dried polymer data obtained from two different experiments are set out in Table I under Experiment numbers 1b and 2b.

Analysis of the polymer after treatment with methanol or alternatively with ethanol or isopropanol and then hexane by nuclear magnetic resonance spectroscopy showed characteristic peaks expected for the polymer represented by the generic structure below and residual amounts of the solvent N-methylpyrrolidone. The treating solvent was evaporated and the residue obtained was shown by NMR to be unreacted silicone and N-methylpyrrolidone. The polymer obtained was analyzed for percent silicon, before and after treatment with methanol and hexane, for intrinsic viscosity, and for weight loss as a function of temperature (10° C./min.) The results of the analysis were as follows:

In the above structure R is methyl for Experiment Numbers 1a and 2a and phenyl for Experiment Numbers 1b and 2b, b is 21 when R is methyl and 14.5 when R is phenyl. In the above structure the ratio values of the recurring amounts a and c are represented as 1:1 as in the ideal case but in actuality depend on the reactivity of the aromatic acid moiety versus the aliphatic acid moiety in the chosen solvent. Also, the structures of a and c are represented as recurring units derived solely from 2,4-toluenediisocyanate, however in actuality depend upon the relative reactivities associated with 2,4-toluenediisocyanate and 2,6-toluenediisocyanate due to steric factors.

EXAMPLE II 1.02 grams ($1.86 \times 10^{-3}$ mole) of methylene bis[N-paraphenylene-4-carboxyphthalimide] and 17.2 grams ($1.86 \times 10^{-3}$ mole) of a phenylmethylsiloxane fluid (D'') chain terminated with 3-carboxypropyldimethylsiloxy groups (M') of structure $M'D''_{65.6}M'$ was dissolved in 57.55 grams of N-methylpyrrolidone. To this mixture was added 0.11 gram of triethylenediamine catalyst. The mixture was heated to 140° C. and the addition of toluenediisocyanate, 0.65 gram ($3.72 \times 10^{-3}$ mole), was started. The progress of the reaction was followed by observing the $CO_2$ evolution and the increase in viscosity of the solution. At the end of the toluenediisocyanate addition the reaction mixture was titrated with toluenediisocyanate by observing the $CO_2$ evolution. This was continued until the $CO_2$ evolution stopped or until the viscosity was such that the solution collapsed in on a mixer stirrer shaft. The reaction mixture was treated in the same manner that was mentioned in the previous Example after the $CO_2$ evolution ceased. The data obtained from examination of the

TABLE I

| Exp. Number | Carboxysilicone | %ST[1] | %SBT[2] | %SAT[3] | IV[4] | % Yield | wt. % a/a+b | unit ratio a/a+b |
|---|---|---|---|---|---|---|---|---|
| 1a | Dimethyl | 24.98 | 19.2 | 19.7 | 0.149 | 44 | 24.5 | 0.5 |
| 2a | Dimethyl | 24.98 | 22.6 | 20.0 | 0.13 | 70 | 24.5 | 0.5 |
| 1b | Methylphenyl | 15.46 | 13.9 | 14.4 | 0.436 | — | 21.1 | 0.5 |
| 2b | Methylphenyl | 15.46 | — | 15.0 | 0.408 | 82 | 21.1 | 0.5 |

*-The term treatment includes the following process steps: 36 hour extraction with methanol followed by 12 to 20 hours extraction with hexane in a Soxhlet extraction apparatus.
[1]- % Silicon Theory The structure of the polymer based upon the percentage silicon value, NMR, yield in the method of synthesis, set out hereinbefore in Examples I(A) and I(B) are as follows:

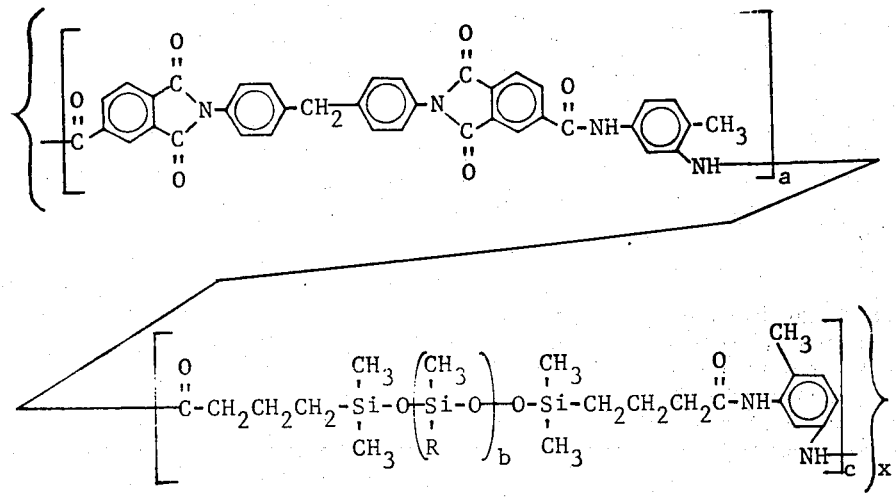

polymer obtained during this experiment is set out in Table II under Experiment Numbers 3a and 3b.

equilibrated dicarboxyterminated polydimethylsiloxane as a reactant in the preparation of the block

TABLE II

| Exp. Number | Carboxysilicone | % Silicon Theory | % Silicon Before Treatment | % Silicon After Treatment | Intrinsic Viscosity | % Yield |
|---|---|---|---|---|---|---|
| 3a | Methylphenyl | 19.1 | 19.0* | 19.1* | 0.42 | — |
| | | Solvent | $\overline{M}w$ | $\overline{M}n$ | $\overline{M}w/\overline{M}n$ | $\overline{M}z$ | $\overline{M}z/\overline{M}w$ |
| 3b | GPC Data (uncorrected) | DMF | 301,569 | 52,294 | 5.77 | 2,168,821 | 7.19 |

*-The above silicon before treatment and after treatment data indicate that all of the silicone was reacted into the copolymer since the percentage silicon before solvent extraction was essentially unchanged after solvent extraction.

The extracted dried polymer recovered had a rubbery appearance and readily dissolved in DMF.

EXAMPLE III 5.46 grams ($1 \times 10^{-2}$ mole) of methylene bis[N-paraphenylene-4-carboxyphthalimide] and 3.06 grams ($1 \times 10^{-2}$ mole) of bis-carboxypropyltetramethyldisiloxane of structure $(M')_2$ was dissolved in 33.13 grams ($32 \times 10^{-2}$ mole) of N-methylpyrrolidone. To this mixture was added 0.228 gram ($2 \times 10^{-3}$ mole) of triethylenediamine catalyst. The mixture was heated to 150° C. and the addition of toluenediisocyanate, 3.48 grams ($2 \times 10^{-2}$ mole), was started. The progress of the reaction was followed by observing the $CO_2$ evolution and the increase in viscosity of the solution. At the end of the toluenediisocyanate addition the reaction mixture was titrated with toluenediisocyanate by observing the $CO_2$ evolution. This was continued until the $CO_2$ evolution stopped or until the viscosity was such that the solution collapsed in on a mixer stirrer shaft. The reaction mixture was treated in the same manner that was mentioned in the previous example after the $CO_2$ evolution ceased. The data obtained from this experiment is set out in Table III under item number IVA.

polymers of this invention.

The compositions of the present invention have many uses. Because of their high temperature resistance, they are exceptionally suitable as insulation for electrical conductors. Solutions of the polymer composed of recurring units of the structural Formulas I or II and III can be applied as coatings to electrical conductors such as copper, aluminum, alloys of copper, etc., and thereafter the coated conductors heated at the elevated temperatures required to effect removal of the solvent.

Films can be cast from solutions of the compositions of Formulas I or II and III, and the solvent then can be evaporated by heating the film at the elevated temperatures required for the purpose. Films thus obtained can be used in packaging applications where resistance to high temperatures is desired. These films can also be used as slot liners in motors to take advantage of the heat stability and solvent resistance of the polymers as well as be used to wrap electrical conductors and to protect the conductors from deterioration to the elements including heat and corrosive and abrasive actions of an environment.

While the foregoing examples of necessity have been limited to only a very few of the many variables within

TABLE III*

| Exp. Number | Carboxydisiloxane | % Silicon Theory | % Silicon Before Treatment | % Silicon After Treatment | Intrinsic Viscosity | % Yield |
|---|---|---|---|---|---|---|
| 4a | Dimethyl (M'M') | 5.46 | 3.7 | 3.9 | 0.54 | 70 |
| | | Solvent | $\overline{M}w$ | $\overline{M}n$ | $\overline{M}w/\overline{M}n$ | $\overline{M}z$ | $\overline{M}z/\overline{M}w$ |
| 4b | GPC Data (uncorrected) | DMF | 87,900 | 44,300 | 1.98 | 185,600 | 2.11 |

*-The above data indicate that the amount of 'MM' incorporated into the copolymer was less than design; however, no silicone (analyzed as % silicon) was removed on extraction.

The powder recovered from the experiment set out hereinbefore was dried, extracted with hexane and had a rubbery appearance and readily dissolved in DMF and NMP. The dried extracted polymer had an amorphous solid very pale yellow appearance which dissolved and NMP yielding a very viscous solution having a solids content of about 15–20 weight percent.

The molecular weight polymer properties set out in Examples I and II demonstrate the increase in molecular weight that can be obtained by the use of equilibrated high molecular weight dicarboxyterminated polymethylphenylsiloxane as opposed to the use of the the scope of the present invention, it should be understood that the present invention covers a much broader class of organo-(block-amide-siloxane)-(block-amide-imide) polymers composed of the units shown in Formulas I, and/or II and III, described hereinbefore in the specification.

What we claim as new and desire to secure by Letters Patent in the United States is:

1. A process which comprises effecting a reaction between:
  1. an organodicarboxyterminated imide of the formula selected from the group consisting of A. 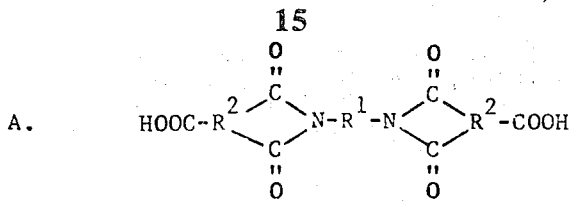

and

B. 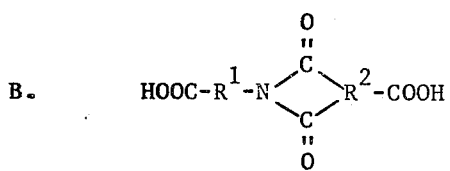

or mixtures thereof, wherein $R^1$ is selected from the group consisting of substituted and unsubstituted divalent hydrocarbon radicals, and combinations thereof, and each $R^2$ is a trivalent aromatic hydrocarbon radical;

2. an organodicarboxyterminated polysiloxane of the formula $$(HOOCR^3)_d(R^4)_{e}(R^5)_f SiO_{[4-(d+e+f)]/2}$$

wherein each $R^3$ is an alkylene radical of from about 2 to about 12 carbon atoms, $R^4$ and $R^5$ are monovalent hydrocarbon radicals, d is equal to from 0.001 to 1, inclusive, e is equal to from 0 to 2, inclusive, f is equal to from 0 to 3, inclusive, and the sum of d, e and f is equal to from 1.5 to 3, inclusive and;

3. an organodiisocyanate of the formula $$O=C=N-R^6-N=C=O$$

wherein $R^6$ is selected from the group consisting of divalent hydrocarbon radicals which contain at least 3 carbon atoms and which are free from aliphatic unsaturation.

2. A process in accordance with claim 1, wherein the reaction is effected in the presence of a homogeneous reaction medium solvent.

3. A process in accordance with claim 2, wherein the reaction is effected in the presence of a reaction promoter.

4. A process in accordance with claim 3, wherein the reaction is effected within a temperature range of from about 23° C. to about 200° C.

5. A process in accordance with claim 4, wherein said organodicarboxyterminated imide is methylene bis[N-paraphenylene-4-carboxyphthalimide], said organodicarboxyterminated polysiloxanne is a dimethylsiloxane fluid (D) chain terminated with 3-carboxypropyldimethylsiloxy groups (M') of the structure M'(D$_x$)M', wherein x is about 21, said oraganodiisocyanate is a mixture of 2,4-/2,6-toluenediisocyanate (80:20), said solvent is N-methylpyrrolidone, and said reaction promoter is triethylenediamine.

6. A process in accordance with claim 4, wherein said organodicarboxyterminated imide is methylene bis[N-paraphenylene-4-carboxyphthalimide], said organodicarboxyterminated polysiloxane is a phenylmethylsiloxane fluid (D'') chain terminated with 3-carboxypropyldimethylsiloxy groups (M') of the structure M'(D'')$_y$M', wherein y is about 14.5, said organodiisocyanate is a mixture of 2,4-/2,6-toluenediisocyanate (80:20), said solvent is N-methylpyrrolidone, and said reaction promoter is triethylenediamine.

7. A process in accordance with claim 4, wherein said organodicarboxyterminated imide is methylene bis[N-paraphenylene-4-carboxyphthalimide], said organodicarboxyterminated polysiloxane is a dimethylsiloxane fluid (D) chain terminated with 3-carboxypropyldimethylsiloxy groups (M') of the structure M'(D'')$_y$M', wherein y is about 65.6, said organodiisocyanate is a mixture of 2,4-/2,6-toluenediisocyanate (80:20)$_y$, said solvent is N-methylpyrrolidone, and said reaction promoter is triethylenediamine.

8. The process in accordance with claim 2, wherein said solvent comprises a highly polar solvent.

9. A process in accordance with claim 8, wherein said solvent comprises a nonpolar solvent.

10. A process in accordance with claim 8, wherein said highly polar solvent is selected from the group consisting of N,N-dimethylformamide, N-N-dimethylacetamide, N-N-diethylformamide, N,N-diethylacetamide, N,N-dimethylmethoxyacetamide, dimethylsulfoxide, N-methyl-2-pyrrolidone, pyridine, dimethylsulfone, dhexamethylphosphoramide, tetramethylenesulfone, dimethyltetramethylenesulfone, dioxane, benzonitrile, β-ethoxyethylacetate, butyrolactone, and mixtures thereof.

11. A process in accordance with claim 9, wherein the process is carried out at a temperature of at least about 160° C.

12. A process in accordance with claim 3, wherein said promoter comprises a catalytically active tertiary amine.

13. A process in accordance with claim 12, wherein said catalytically active tertiary amine is selected from the group consisting of triethylamine, tributylamine, dimethylethylamine, dimethylcyclohexylamine, triphenylamine, tritolylamine, dimethylphenylamine, benzyldimethylamine, trinaphthylamine, pyridine, quinoline, N-methylpiperidine, N,N,N', N'-tetramethylethylenediamine, N,N,N', N'-tetramethylbutylenediamine, tetramethylquanidine, triethylenediamine, and mixtures thereof.

14. A process in accordance with claim 4, wherein said organodicarboxyterminated polysiloxane is of the structure $$M'(D')_cM',$$

wherein at least one M' is an $(R^3)_3SiO_{1/2}$ radical, at least one of the at least one M' $R^3$ groups is a carboxyterminated alkylene radical, and the other at least one M' $R^3$ groups are the same as defined hereinbefore; the other M' is an $(R^3)_3Si$ radical at least one of the other M' $R^3$ groups is a carboxyterminated alkylene radical; D' is an

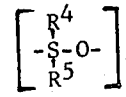

group, wherein $R^4$ and $R^5$ are the same as defined hereinbefore; and c is a positive number having a value of from 0 to about 500.

15. The process in accordance with claim 14, wherein at least one $r^4$ is an alkyl group and at least one $R^5$ is an aryl group.

16. A process in accordance with claim 3, wherein said catalytically active tertiary amine is present in an amount of from about 0.1 to about 1% by weight based on the total weight of the reaction mixture.

17. A composition of matter prepared in accordance with claim 1, comprising high molecular weight polymers having essentially linear recurring units of the formula selected from the group consisting of

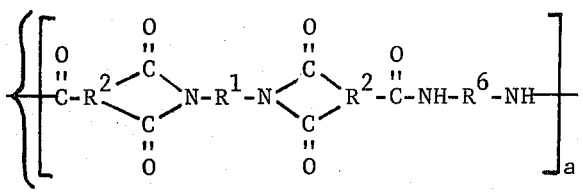

and,

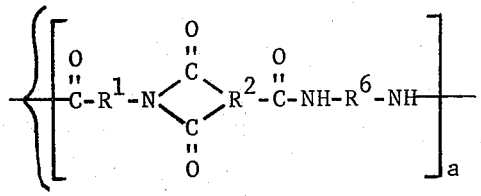

or mixtures thereof, wherein $a$ is a positive number, $R^1$ is selected from the group consisting of substituted and unsubstituted divalent hydrocarbon radicals, each $R^2$ is a trivalent aromatic hydrocarbon radical, each $R^6$ is selected from the group consisting of divalent hydrocarbon radicals free of aliphatic unsaturation which contain at least three carbon atoms, and a recurring unit of the formula

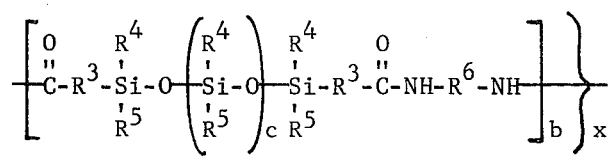

wherein $b$ is a positive number, the unit number ratio of $a/a+b$ is within the range of from about 0.01 to about 0.99, $c$ is a positive number within the range of from about 0 to about 500, $x$ is a positive number within the range of from about 4 to about 10,000, wherein each $R^3$ is an alkylene radical of from about 2 to about 12 carbon atoms, each $R^4$ and $R^5$ are monovalent hydrocarbon radicals, and $R^6$ is the same as defined hereinbefore.

18. A composition in accordance with claim 17, formulas I and III, wherein $R^1$ is a

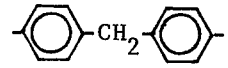

radical, $R^2$ is selected from phenylene-1,2,4, and phenylene-1,2,5, $R^3$ is trimethylene, $R^4$ and $R^5$ are selected from the group consisting of methyl and phenyl, $R^6$ is selected from the group consisting of 1-methyl-2,4-phenylene and 1-methyl-2,6-phenylene radicals.

19. A composition in accordance with claim 18, wherein $R^4$ and $R^5$ are methyl radicals.

* * * * *

UNITED STATES PATENT OFFICE
CERTIFICATE OF CORRECTION

PATENT NO. : 3,887,636
DATED : June 3, 1975
INVENTOR(S) : Peter C. Juliano, Tyrone D. Mitchell and Simon W. Kantor It is certified that error appears in the above-identified patent and that said Letters Patent are hereby corrected as shown below:

Column 15, line 26, cancel the entire line and substitute the following:

-- C. $(HOOCR^3)_d(R^4)_e(R^5)_f SiO_{\frac{4-(d+e+f)}{2}}$ -- ;

Column 15, line 35, at left-hand margin, add -- D. --;

Column 15, line 56, cancel "oraganodiisocya-" and substitute -- organodiisocya- --;

Column 16, line 66, "$r^4$" should read -- $R^4$ --;

Columns 17-18, claim 17, three formulas should be identified, at left-hand margin, with -- I --, -- II --, and -- III --.

Signed and Sealed this eighteenth Day of November 1975

[SEAL]

Attest:

RUTH C. MASON
Attesting Officer

C. MARSHALL DANN
Commissioner of Patents and Trademarks